May 3, 1927.
J. W. LAWRIE
1,627,040
METHOD OF RECOVERING GLYCERINE FROM FERMENTED MOLASSES
MASH AND APPARATUS THEREFOR
Filed June 6, 1922
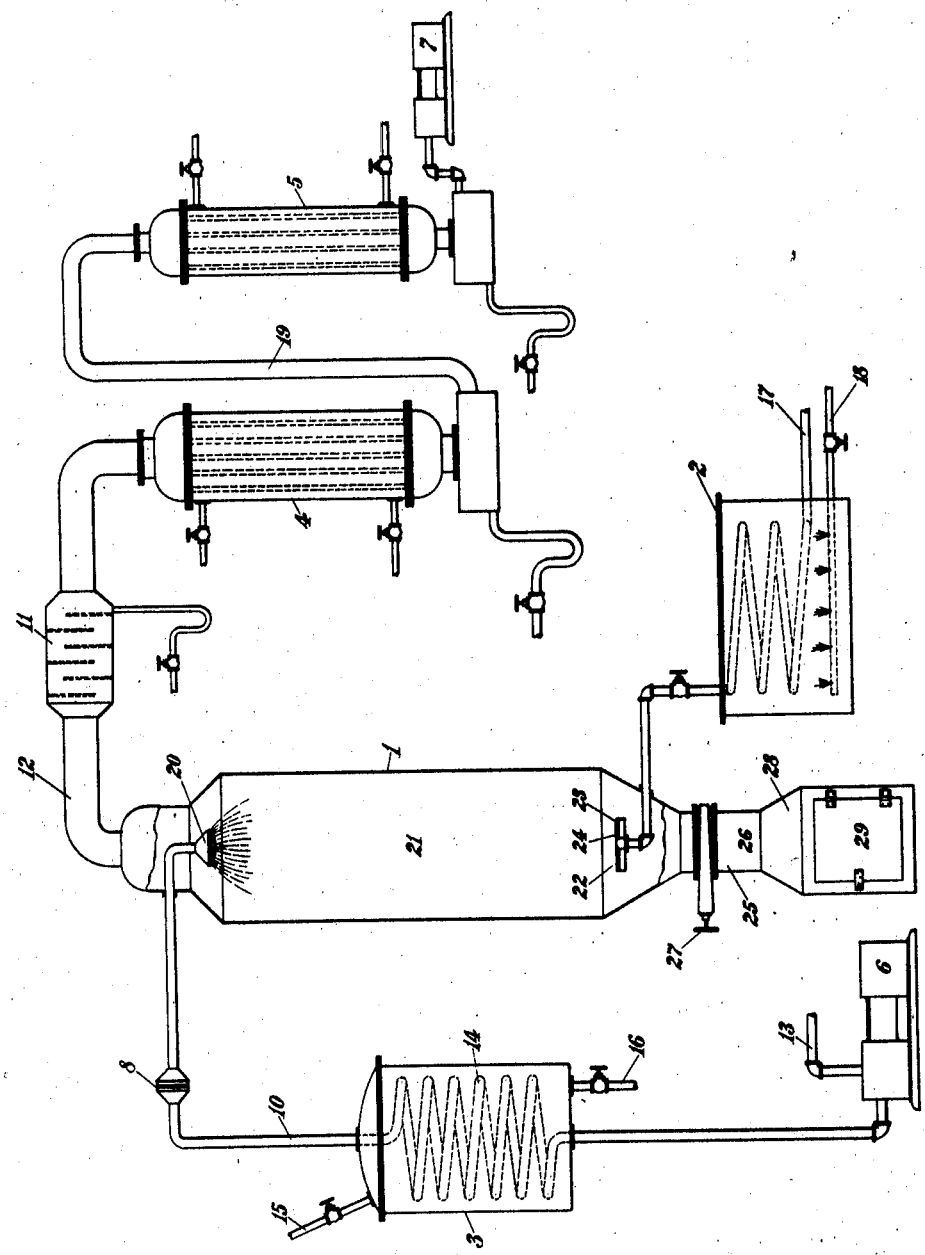
J.W.Lawrie Inventor
By his attorney J.R.Squair.

Patented May 3, 1927.

1,627,040

UNITED STATES PATENT OFFICE.

JAMES W. LAWRIE, OF WILMINGTON, DELAWARE, ASSIGNOR TO E. I. DU PONT DE NEMOURS & CO., OF WILMINGTON, DELAWARE, A CORPORATION OF DELAWARE.

METHOD OF RECOVERING GLYCERIN FROM FERMENTED MOLASSES MASH AND APPARATUS THEREFOR.

Application filed June 6, 1922. Serial No. 566,257.

This invention is in the art of producing glycerin by the fermentation of molasses. It relates more particularly to a method of recovering the glycerin from the fermented mash and yet more particularly to the removal, by distillation, of the glycerin from what may be termed the "concentrated slop" i. e. the mass obtained by the removal of alcohol from, and the concentration of, the fermented molasses mash. Also the invention relates to apparatus for the performance of the mentioned distillation.

It is possible to produce glycerin by the fermentation of molasses, especially black strap or cane molasses; it can be done by fermentation in the presence of salts or alkalies. But when the recovery of the glycerin so produced is attempted by the ordinary distillation methods great difficulties are encountered. Ordinary black strap molasses contains about 46% of sucrose and invert sugars which are fermentable and in addition has about 4% of non-fermentable ingredients which will reduce Fehling's solution, some 20% water and the rest gums, pectins, salts, and so forth. Usually from 25 to 30% of the actual sugars, sucrose and invert sugar present in the molasses are converted to glycerin and 35 to 45% to alcohol. The fermented mash or beer therefore has a concentration of about 3% glycerin, 6% alcohol and 7 to 8% gums and so forth. On distillation of the alcohol and concentration of the alcohol-free beer or "slop" a viscous liquid containing up to 15 to 18% glycerin, and also containing most of the salts added, is obtained. On distilling this material in the ordinary type kettle vacuum still only very indifferent yields of glycerin are obtained, varying from almost none to not higher than 50%, generally speaking, of the glycerin in the beer. Certain of the reasons for this low recovery are as follows:

Due to the large amount of gums and salts present the concentration of the glycerin is low and as the salts and gum are poor conductors of heat it takes a very long time to heat the mass to the proper distillation temperature. As the temperature is being brought up the mass becomes almost solid, being substantially like pitch in its physical properties. After part of the glycerin has distilled over the heat conductance is so low that the rest of the glycerin will not be distilled. Again, under the conditions produced during the distillation practically all the water is distilled out and the superheated steam used channels through the mass. These conditions are very favorable to the production of di-glycerin and acrolein, and in consequence a large portion of the glycerin is lost by decomposition.

A further difficulty is that since the mass in the still becomes almost solid it is washed out only with considerable difficulty. Also the method is not continuous and has to be carried out by the batch method. Thus, not only is the recovery of glycerin usually under 50% for reasons of which those mentioned above are examples but also due to operating difficulties the output per hour is very low.

In avoidance of the various difficulties certain methods have been developed which call for the precipitation of most of the gums and salts from the dilute slop whereby it has, upon concentration, been possible to get a "clarified" concentrate containing up to 35%, or better, of glycerin, and this concentrate on distillation has given a glycerin recovery somewhat better than that mentioned above. But these "clarification" methods are expensive and complicated, rendering the devising of a less expensive and simpler method highly desirable. Now I have devised a method of recovering the glycerin from the fermented molasses mash or beer or, more exactly, from the concentrated slop, by which the various difficulties incident to the ordinary distillation methods and also the objectionable features of the clarification methods are avoided.

In accordance with the present invention as preferably practiced, no precipitation of the gums, salts, etc., is made, as in the clarification methods (such complications being avoided), and the thin liquid resulting from the fermentation is straightway freed from alcohol and concentrated to a relatively thick mass, i. e. the "viscous liquid" heretofore mentioned in discussing the prior methods involving ordinary distillation. Such mass contains, substantially 50 to 60% solids, 15 to 18% glycerin, and the remainder water. This mass, in accordance with my discovery of the possibility and practicability thereof, is sprayed into a chamber or still, and there intimately mingled with steam, the mass preferably being preheated and the steam superheated prior to introduction into the chamber, and the temperature being maintained such that the glycerin is quickly vaporized. With this procedure the finely divided material presents a large surface to the steam and a large amount of glycerin is distilled over, the heat of the steam quickly penetrating the entire mass of each particle of the material to vaporize the glycerin, and the steam itself, by lowering the partial vapor pressure, assisting in driving out the glycerin. In this way the difficulties of the ordinary distillation methods are avoided.

As will be understood by those skilled in the art, the fermented molasses mash is desirably distilled with steam in a beer still to remove alcohol, the alcohol-free liquid or slop evaporated in a triple effect evaporator, to remove water, and again evaporated in a finishing evaporator to remove additional water, thus giving the before-mentioned viscous liquid or unclarified concentrated slop which cannot be satisfactorily treated to recover glycerin by the ordinary methods of distillation. The vapors issuing from the still in the practice of the present method are desirably passed through suitable apparatus, as condensers of any preferred type, to recover the glycerin, and condense the water vapors. The residue collecting in the still may of course be removed at convenience.

One object of the invention is to provide a method of the general character above indicated for recovering glycerin from fermented molasses mash, and, more particularly, from unclarified concentrated slop. Another object is to provide apparatus for the recovery of glycerin in accordance with the present method. To these ends, and also to improve generally upon methods and apparatus of the character indicated, the invention consists in the various matters described and claimed herein.

The better to describe the invention, reference is made to the apparatus illustrated in the accompanying drawing, it being understood that the invention is not restricted thereto. In the drawing the figure is a conventional and somewhat diagrammatic elevational view with certain parts broken out to show interiors.

The assembly shown comprises in general an evaporating chamber or still, designated generally as 1, an oil-burning superheater 2 for steam, a steam heated preheater 3 for the unclarified concentrated slop, suitable condensers of any desired type, the one, 4, for condensing the glycerin and the other, 5, for condensing the water vapors, a slop pump 6, and a vacuum pump 7, the various units being relatively connected as shown. A filtering screen 8 is desirably inserted in the slop pipe 10, and a catch-all 11, conveniently of the baffle-plate type, inserted in the vapor conduit 12. The unclarified concentrated slop is supplied to the pump 6 by the pipe 13 from any desired supply and pumped through the coil 14 of the preheater 3, while steam from any suitable source (not shown) is supplied to the steam space of the preheater by the pipe 15, and discharged at 16. The steam pipe 17, from any desired generator (not shown) is passed through the heater 2. The burner of the heater is indicated at 18. The condensers 4 and 5 are connected by the pipe 19 for conveying the water vapors from the glycerin condenser to the water vapor condenser. As will be understood, the condensers may be of the indirect type with cooling medium circulated therethrough without direct contact or mingling of the medium and the vapors. The medium is of course at such temperature that the glycerin is condensed in condenser 4 while the water vapors pass on and are condensed in 5.

The evaporator or still 1 is provided at its upper end with a preferably pressure atomizing sprayer 20 for spraying the unclarified concentrated slop into the chamber 21 of the still, the said sprayer being connected with the pipe 10 to receive its supply of slop from the pump 6, by way of the preheater 3. At the lower end of the still 1 the same is provided with a device for supplying steam to the chamber, the illustrated device being shown as a cross 22 with its arms 23 perforated at 24 to introduce the steam in small streams or jets. Steam is supplied to the cross by the steam supply pipe 17 heretofore mentioned. At its bottom the still 1 is furnished with a straight-away discharger 25 providing for the discharge of residue as desired. As here illustrated the discharger comprises the passage 26 of relatively large cross-section and valved at 27, and the connected receiver 28 with closing door 29; upon closing the (normally open) valve 27 the door 29 of the receiver 28 can be opened for the removal of collected residue without breaking the vacuum in the system.

In the operation of the still the sprayed slop and the steam mingle therein, the heat of the steam quickly penetrates each particle of slop, and the slop is quickly heated to remove the glycerin therefrom. As will be understood from the foregoing, during the operation the unclarified concentrated slop is pumped by the pump 6 to the sprayer 20, being preheated by the preheater 3 in its passage; steam is supplied to the device 22 by the pipe 17 and is superheated by the oil heater 2; and the evolved glycerin vapors (and steam) pass through the pipe 12 and the catch-all 11 (where they are freed from entrained matters if there be any) to the condenser 4 where the glycerin is recovered, the water vapor passing on and being condensed in the condenser 5. In the meantime the pump 7 is operated to create such vacuum as desired.

As will be evident, the method may be practiced under various detailed conditions but merely as an example I may say that I have worked with the following conditions obtaining: vacuum on still, 27.5 to 28 in.; boiler pressure of steam supplied to the still, 140 lbs. gauge; temperature of the steam at the superheater 650° F., steam pressure at superheater 58 lbs. gauge; temperature at top of still 150° C. (302° F.) indicating a maximum temperature in the chamber of nearly 175° C. (347° F.); vapor temperature at first catch-all 325° F. (163° C.); slop preheated at least to boiling point at atmospheric pressure, i. e. 105°–110° C. (221–230° F.) for the slop in question; slop pressure, 30–40 lbs. gauge. In the work referred to a still about 7 feet in diameter and 12 feet high was used, and a pressure atomizing sprayer.

It will be seen that the invention as it relates to apparatus and to procedure provides for the ready recovery of glycerin from fermented black strap molasses mash or beer and, more definitely, from the unclarified concentrated slop obtained by the removal of alcohol from the beer and by concentration of the alcohol-free liquid or slop without clarification of the slop. Thus black strap molasses can be satisfactorily used as the source of fermentable material, previous difficulties of glycerin recovery having been overcome, this being a particularly desirable result, as black strap molasses is the cheapest and one of the few materials which will allow of the production of fermentation glycerin which can compete with glycerin from fats, oils and so forth.

I claim:

1. In the art of producing glycerin by the fermentation of molasses, the steps of bringing unclarified concentrated slop into contact with a hot gaseous carrier while finely dividing the slop into minute portions under pressure to present an extensive surface to the carrier and maintaining a temperature to quickly vaporize the glycerin from the slop, and condensing the evolved glycerin vapors.

2. In the art of producing glycerin by the fermentation of molasses, the steps of bringing unclarified concentrated slop into contact, under vacuum, with a hot gaseous carrier while finely dividing the slop into minute portions under pressure to present an extensive surface to the carrier and maintaining a temperature to quickly vaporize the glycerin from the slop, and condensing the evolved glycerin vapors.

3. In the art of producing glycerin by the fermentation of molasses, the steps of pressure atomizing unclarified concentrated slop and introducing it into contact with steam while maintaining a temperature to quickly vaporize the glycerin from the slop, and condensing the evolved glycerin vapors.

4. In the art of producing glycerin by the fermentation of molasses, the steps of pressure atomizing unclarified concentrated slop and introducing it into contact with superheated steam at a temperature to quickly vaporize the glycerin from the slop, and condensing the evolved glycerin vapors.

5. In the art of producing glycerin by the fermentation of molasses, the steps of pressure atomizing unclarified concentrated heated slop and introducing it into contact with superheated steam, with the slop heated and the steam superheated to maintain a temperature to quickly vaporize the glycerin from the slop, and condensing the evolved glycerin vapors.

6. In the art of producing glycerin by the fermentation of molasses, the steps of pressure atomizing unclarified concentrated heated slop and introducing it into contact, under vacuum, with superheated steam, with the slop heated and the steam superheated to maintain a temperature to quickly vaporize the glycerin from the slop, and condensing the evolved glycerin vapors.

7. In the art of producing glycerin by the fermentation of molasses, the steps of heating the unclarified concentrated slop, bringing the heated slop into contact with a hot gaseous carrier while pressure atomizing the slop under a pressure of at least approximately 30 pounds per square inch, to present an extensive surface to the carrier and maintaining a temperature to quickly vaporize the glycerin from the slop, and condensing the evolved glycerin vapors.

8. In the art of producing glycerin by the fermentation of molasses, the steps of spraying unclarified concentrated slop, heated to at least its atmospheric pressure boiling point, and at a gauge pressure of substantially between 30 to 40 pounds per square inch, into contact, under a vacuum of substantially 27.5 inches of mercury, with steam at a gauge pressure of substantially 58 pounds per square inch, temperature substantially 650° F., thereby to quickly vaporize the glycerin from the slop, and condensing the evolved glycerin vapors.

In testimony whereof I affix my signature.

JAMES W. LAWRIE.